United States Patent
Warburton et al.

(10) Patent No.: US 9,636,978 B2
(45) Date of Patent: May 2, 2017

(54) POWER TAILGATE SYSTEM AND METHOD

(71) Applicant: JAGUAR LAND ROVER LIMITED, Warwickshire (GB)

(72) Inventors: Andrew Warburton, Coventry (GB); Duncan Loveday, Coventry (GB); Steven Thomas, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/426,219

(22) PCT Filed: Sep. 5, 2013

(86) PCT No.: PCT/EP2013/068410
§ 371 (c)(1),
(2) Date: Mar. 5, 2015

(87) PCT Pub. No.: WO2014/037468
PCT Pub. Date: Mar. 13, 2014

(65) Prior Publication Data
US 2015/0217631 A1 Aug. 6, 2015

(30) Foreign Application Priority Data

Sep. 6, 2012 (GB) .................................. 1215962.0
May 1, 2013 (GB) .................................. 1307884.5

(51) Int. Cl.
*B60J 5/10* (2006.01)
*E05F 15/622* (2015.01)
(Continued)

(52) U.S. Cl.
CPC .............. *B60J 5/103* (2013.01); *E05F 15/622* (2015.01); *E05F 15/63* (2015.01); *E05F 15/53* (2015.01);
(Continued)

(58) Field of Classification Search
CPC ......... B60J 5/103; E05F 15/63; E05F 15/622; E05F 15/53; E05Y 2900/546; E05Y 2900/544; E05Y 2600/46; E05Y 2400/415
(Continued)

(56) References Cited

U.S. PATENT DOCUMENTS 2,793,907 A * 5/1957 Hess ...................... B60J 1/1861
292/144
2,999,683 A * 9/1961 Pickles ................. E05F 15/622
296/76
(Continued)

FOREIGN PATENT DOCUMENTS

CN 2774835 Y 4/2006
KR 100260405 B1 8/2000
(Continued)

OTHER PUBLICATIONS

Combined Search and Examination Report under Sections 17 and 18(3) for Application No. GB1307884.5 dated Nov. 29, 2013.
(Continued)

*Primary Examiner* — Justin Rephann
(74) *Attorney, Agent, or Firm* — Carlson, Gaskey & Olds

(57) ABSTRACT

A door system for a vehicle comprises a first vehicle door (16) hingedly mountable to a vehicle for articulation about a pivot axis (123) between a closed position and an open position, the door comprising a cavity; an actuator mechanism (100) disposed within the cavity, the actuator mechanism being pivotally coupleable to the vehicle at a position offset from the pivot axis; and drive means for driving the actuator mechanism to articulate the first vehicle door between said closed and said open positions.

17 Claims, 14 Drawing Sheets

(51) Int. Cl.
*E05F 15/63* (2015.01)
*E05F 15/53* (2015.01)

(52) U.S. Cl.
CPC ..... *E05Y 2400/415* (2013.01); *E05Y 2600/46* (2013.01); *E05Y 2900/544* (2013.01); *E05Y 2900/546* (2013.01)

(58) Field of Classification Search
USPC .................................... 296/50, 51, 56, 57.1
See application file for complete search history.

(56) References Cited

U.S. PATENT DOCUMENTS

| | | | | |
|---|---|---|---|---|
| 3,069,151 | A * | 12/1962 | Cook | E05F 15/622 49/139 |
| 3,202,414 | A * | 8/1965 | Simmons | E05F 15/622 49/280 |
| 3,274,732 | A * | 9/1966 | Murakami | E05F 15/622 49/280 |
| 3,306,655 | A | 2/1967 | Voehringer | |
| 3,398,484 | A * | 8/1968 | Katsumura | E05F 15/622 318/268 |
| 5,896,703 | A * | 4/1999 | Wright | E05F 15/627 192/48.2 |
| 6,092,336 | A * | 7/2000 | Wright | E05F 1/1091 192/48.2 |
| 6,227,594 | B1 * | 5/2001 | Pommeret | B60J 5/101 296/37.1 |
| 6,305,737 | B1 | 10/2001 | Corder et al. | |
| 6,773,047 | B2 * | 8/2004 | Gruber | B62D 33/0273 296/57.1 |
| 6,793,264 | B1 * | 9/2004 | Muller | E05F 1/1091 16/71 |
| 6,814,392 | B1 * | 11/2004 | Tomaszewski | E05F 15/622 296/146.4 |
| 7,281,748 | B2 * | 10/2007 | Ruhlander | B62D 33/0273 292/144 |
| 7,556,303 | B2 * | 7/2009 | Waldner | B62D 33/037 292/194 |
| 7,695,043 | B2 * | 4/2010 | Zagoroff | B62D 33/03 296/50 |
| 9,103,154 | B2 * | 8/2015 | Sitzler | E05F 15/622 |
| 2003/0089041 | A1 * | 5/2003 | Daniels | E05F 15/619 49/341 |
| 2004/0036318 | A1 * | 2/2004 | Maeda | B60J 5/103 296/146.8 |
| 2005/0155289 | A1 * | 7/2005 | Oberheide | E05F 1/1091 49/340 |
| 2006/0202500 | A1 * | 9/2006 | Eschebach | B62D 33/0273 296/57.1 |
| 2007/0152471 | A1 * | 7/2007 | Zagoroff | B62D 33/03 296/146.4 |
| 2007/0187987 | A1 * | 8/2007 | Legon | E05F 15/63 296/146.8 |
| 2008/0054667 | A1 * | 3/2008 | Ohly | B62D 33/0273 296/57.1 |
| 2008/0066385 | A1 * | 3/2008 | Roach | B62D 33/0273 49/386 |
| 2008/0196314 | A1 * | 8/2008 | Stratten | B62D 33/0273 49/386 |
| 2008/0197651 | A1 * | 8/2008 | Stratten | B62D 33/0273 296/50 |
| 2008/0197652 | A1 * | 8/2008 | Stratten | B62D 33/03 296/57.1 |
| 2009/0051192 | A1 * | 2/2009 | Ewing | E05F 15/622 296/146.2 |
| 2010/0264688 | A1 | 10/2010 | Cheal et al. | |
| 2012/0066977 | A1 * | 3/2012 | Sitzler | E05F 15/622 49/358 |

FOREIGN PATENT DOCUMENTS

| | | |
|---|---|---|
| WO | 2010024173 A1 | 3/2010 |
| WO | 2010119080 A2 | 10/2010 |

OTHER PUBLICATIONS

International Search Report for International application No. PCT/EP2013/068410 dated Feb. 24, 2014.
Examination Report under Section 18(3) for Application No. GB1307884.5, dated Jul. 1, 2015.

* cited by examiner

POWER TAILGATE SYSTEM AND METHOD

TECHNICAL FIELD

The present invention relates to a power tailgate system and method of controlling the same and particularly, but not exclusively, to a power split tailgate actuator mechanism and method. The invention finds advantageous application in vehicles. Aspects of the invention relate to a system, to a method and to a vehicle.

BACKGROUND

A five door vehicle, such as but not limited to a station wagon, sport utility vehicle (SUV), cross-over vehicle (XUV), van, etc., may include a tailgate at a rear of the vehicle. The tailgate gate may include one or more doors that open to provide access to a passenger compartment. On vehicles having a powered tailgate, the tailgate may be opened automatically by a user, when operating the tailgate remotely the user may open the tailgate, with a key fob or similar remote control device.

It is desirable that the actuator and drive mechanism is concealed from view, in particular on vehicles having a split powered tailgate.

It is an aim of the present invention to address this issue. Other aims and advantages of the invention will become apparent from the following description, claims and drawings.

SUMMARY

Aspects of the invention therefore provide a system, a method and a vehicle as claimed in the appended claims.

According to an aspect of the invention for which protection is sought, there is provided a door system for a vehicle comprising:
 a first vehicle door hingedly mountable to a vehicle for articulation about a pivot axis between a closed position and an open position, the first vehicle door comprising a cavity;
 an actuator mechanism disposed within the cavity, the actuator mechanism being pivotally coupleable to the vehicle at a position offset from the pivot axis; and
 drive means for driving the actuator mechanism to articulate the first vehicle door between said closed and said open positions.

Advantageously, the actuator mechanism may be concealed from view improving the vehicle aesthetics, and protecting the actuator mechanism. A further advantage is that the accessibility of the passenger compartment or cargo space of the vehicle is increased.

The pivot axis about which the first vehicle door articulates may be disposed within the cavity.

The drive means may be disposed within the cavity of the first vehicle door.

The system may comprise a hinge having a first part fixed to the first vehicle door and a second part fixable to the vehicle, a pivot axis of the hinge defining the pivot axis about which the first vehicle door articulates.

The actuator mechanism may be pivotally coupled to the second part of the hinge at a position disposed within the cavity of the first vehicle door and offset from the pivot axis.

The actuator mechanism may comprise an actuator and a bell crank, wherein the actuator is coupled to the hinge via the bell crank, the bell crank being pivotally mounted to the first vehicle door within the cavity.

This has the advantage of allowing the actuator mechanism to be placed in a confined space.

The bell crank may be coupled to the hinge by a link arm disposed within the cavity.

The actuator may be mounted in a first orientation and provides linear motion and the bell crank changes the orientation of the linear motion.

Alternatively, the actuator mechanism may be arranged so as to be pivotally coupled to a support structure of the vehicle at a position disposed within the cavity of the first vehicle door and offset from the pivot axis, the first vehicle door being arranged so as to receive at least a portion of said support structure within the cavity when installed on a vehicle.

The drive means may comprise at least one electric motor. The motor may be positioned within a watertight interior of the first vehicle door.

The system may comprise a controller for controlling the drive means so as to cause the actuator mechanism to articulate the first vehicle door between the open and closed positions.

The door system may be a split power door system comprising a second vehicle door arranged to articulate between a closed position and an open position; and a further mechanism for moving the second vehicle door.

The controller may be arranged to independently control the drive means and the further mechanism, and the first and second vehicle doors being arranged such that the second vehicle door must be at least partially opened to allow opening or closing of the first vehicle door.

The system may be a power split tailgate system for a vehicle having a rear storage area.

The first vehicle door may be a lower tailgate door and the second vehicle door may be an upper tailgate door.

The first vehicle door may comprise a retractable suspension means for bearing a load applied to the first vehicle door, wherein the retractable suspension means comprises a retraction device which counterbalances the weight or turning moment of the first vehicle door about the pivot axis.

The retraction device may be disposed within a cavity in the interior of the first vehicle door.

According to another aspect of the invention for which protection is sought, there is provided a method of articulating a door system of a vehicle as described in the preceding paragraphs, the method comprising:
 receiving a command to open or close the first vehicle door;
 driving the drive means; and
 actuating the actuator mechanism to push or pull upon a portion of the vehicle so as to articulate the first vehicle door in the required direction in response to the received command.

According to a further aspect of the invention for which protection is sought, there is provided a vehicle having a door system or adapted to use a method described hereinabove Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which.

DETAILED DESCRIPTION

Detailed descriptions of specific embodiments of the power split tailgate system and method of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the power split tailgate system and method described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
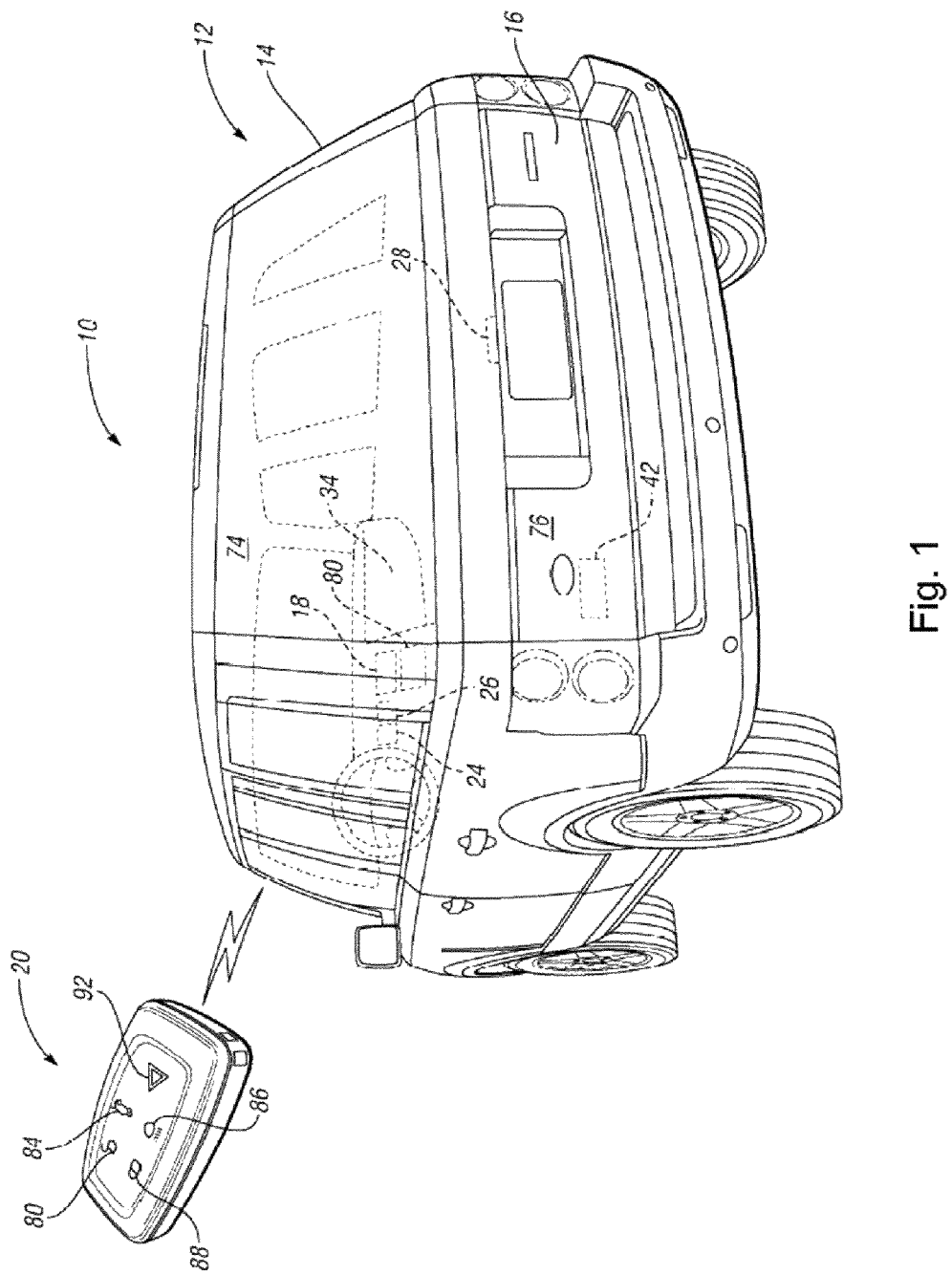
FIG. 1 illustrates a split tailgate system according to an embodiment of the invention.

FIG. 1 illustrates a vehicle 10 having a split tailgate system 12 according to a non-limiting embodiment of the invention. The split tailgate system 12 may be an electrically driven system configured to articulate an upper tailgate door 14 and a lower tailgate door 16 between open and closed positions.

FIGS. 2 to 4b illustrate the automatic movement of one or both of the upper and lower tailgate doors 14, 16 between closed and open positions. As shown, the first, upper, tailgate door 14 may be opened without opening the second, lower, tailgate door 16 (see FIG. 2), both of the upper and lower tailgate doors 14, 16 may be opened at the same time (see FIG. 3), and the lower tailgate door 16 may be opened without opening, or fully opening, the upper tailgate door 14 (see FIGS. 4a and 4b).

Figure 2:
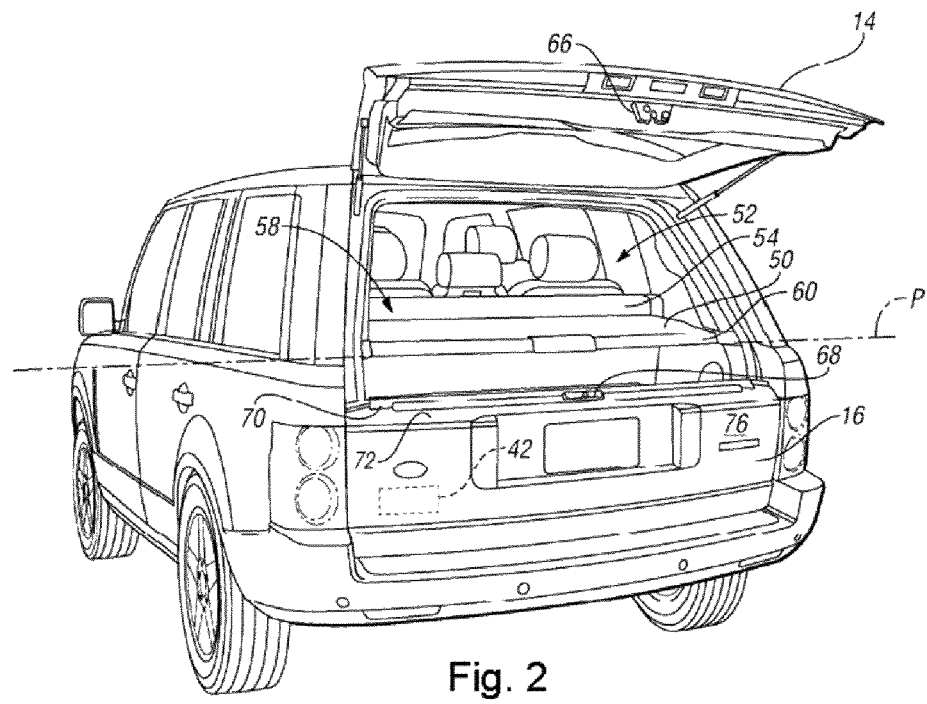
FIG. 2 illustrates articulation of an upper tailgate door to an open position in the system of FIG. 1.
Figure 3:
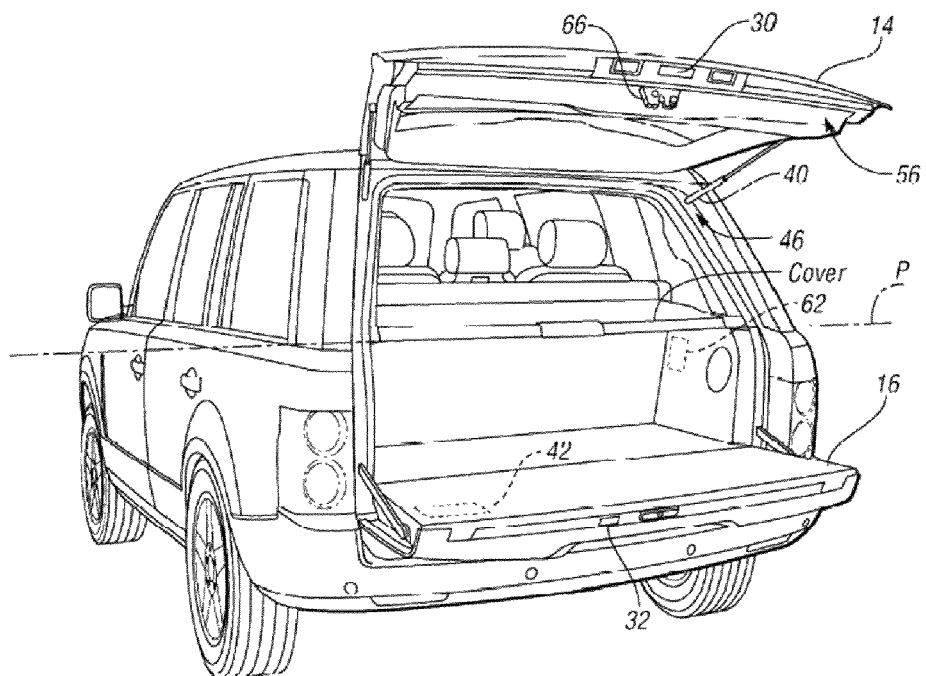
FIG. 3 illustrates articulation of both of an upper and lower tailgate door to an open position in the system of FIG. 1.

As shown in more detail in FIGS. 2 and 3, a compartment cover 50 may be included with a storage area 52 to extend rearwardly from a rear seat 54 to the tailgate doors 14, 16. The compartment cover 50 may be positioned above a bottom 56 of the upper tailgate door 14 when closed and below a top 58 of the rear seat 54 in order to separate the storage area 52 into upper and lower storage portions. The coverage of the compartment cover 50 may be adjusted manually by pushing or pulling a leading edge 60, or optionally, with related control of a compartment cover motor 62.

As shown in FIGS. 2 and 3, the bottom portion 56 of the upper tailgate door 14 includes a lock 66 that mates with a latch 68 included on a lip 70 of the lower tailgate door 16. A ledge 72 is positioned below the latch 68 to cover the bottom 56 of the upper tailgate door 14 so that an exterior portion 74 of the upper door 14 is flush with an exterior portion 76 of the lower door 16 when both are closed (see FIG. 1).

A controller 18 may be included within the vehicle 10 to control tailgate door opening and closing. The controller 18 may be configured to independently control movements of the upper and lower tailgate doors 14, 16. This may include an upper mode control sequence shown in FIG. 2 where the upper door 14 is actuated to the open position while the lower door 16 remains closed. Another door control sequence may be a dual mode shown in FIG. 3 where both of the upper and lower doors 14, 16 are simultaneously articulating. Depending on the shape of the doors 14, 16, this may include articulating the upper door 14 slightly ahead of the lower door 16. Yet another door control sequence may be a chauffeur mode shown in FIG. 4a and FIG. 4b where the lower door 16 is actuated while the upper door 14 remains closed, or substantially closed, as will be described in more detail later.

Wireless messages from a remote control 20, such as but not limited to a fob, may be used to instruct the controller 18 to instigate tailgate door control. Wireline messages from buttons 24, 26, 28, 30, 32 included within a dashboard 34 or a rear of the vehicle 10 may similarly be used to instruct the controller to open and close one or both of the tailgate doors 14, 16. The controller 18 may control operations of an upper electric motor 40 and a lower electric motor 42 in order to respectively control upper and lower tailgate door 14, 16 positioning. While the motors 40, 42 may be positioned anywhere within the vehicle 10, they are shown for exemplary purposes to be disposed within a drain channel 46 around an outer perimeter of the upper tailgate door 14 and within an enclosure of the lower tailgate door 16 that may or may not be watertight, respectively.

Because the motors 40, 42 can be controlled to independently articulate the tailgate doors 14, 16, the present invention is able to sequence tailgate door 14, 16 movements in any suitable manner.

In one control sequence the motors 40, 42 can be controlled so as to open the upper and lower tailgate 14, 16 substantially simultaneously.

In another control sequence or mode of operation the vehicle may be configured such that the upper tailgate 14 only is opened when a signal is received from the remote control 20 or from an internal button 24, 26 within the vehicle 10 (for example on the dashboard 34) or from an external button 28 provided on the rear of the vehicle 10 (for example on the upper tailgate 14). In this upper tailgate only opening mode the lower tail gate 16 can only be opened by a user interaction with a lower tailgate button 32 provided at the rear of the vehicle 10. Optionally, the lower tailgate button 32 is mounted upon the lower tailgate 16, and further optionally the lower tailgate button 32 is only accessible once the upper tailgate 14 has been opened or at least partially opened. The user may insert or extract items from the storage area 52 via the opening created by opening the upper tailgate 14; this has the advantage that the lower tailgate 14 improves cargo retention, by preventing unintentional egress of the items for example by preventing items rolling out of the storage area 52. In situations where the vehicle 10 is being utilised to transport animals e.g. domestic animals (such as dogs) or livestock, the lower tailgate 16 may discourage said animals from exiting the storage area 52 in an uncontrolled manner when loading or unloading the animal into or from the vehicle 10; when unloading the animal the user is provided with an opportunity to gain control of the animal whilst still confined within the storage area 52, once under control the user may subsequently open the lower tailgate 14 by pressing the lower tailgate button 32 to facilitate extraction of the animal. In this mode the user may simultaneously, and remotely (from the tailgate 14, 16), activate closing of both the upper and lower tailgate doors 14, 16 by pressing the same button on the remote control 20 or dashboard 34 of the vehicle 10 which activated the upper only opening mode, or if the lower tailgate 16 is determined to be in a closed position the controller will close the upper tailgate 14.

Another advantage of the upper tailgate only opening mode is that the user can position themselves closer to the rear of the vehicle 10 when loading or unloading and does not need to stretch over the lower tailgate 14 disposed in the opened condition.

Figure 4A:
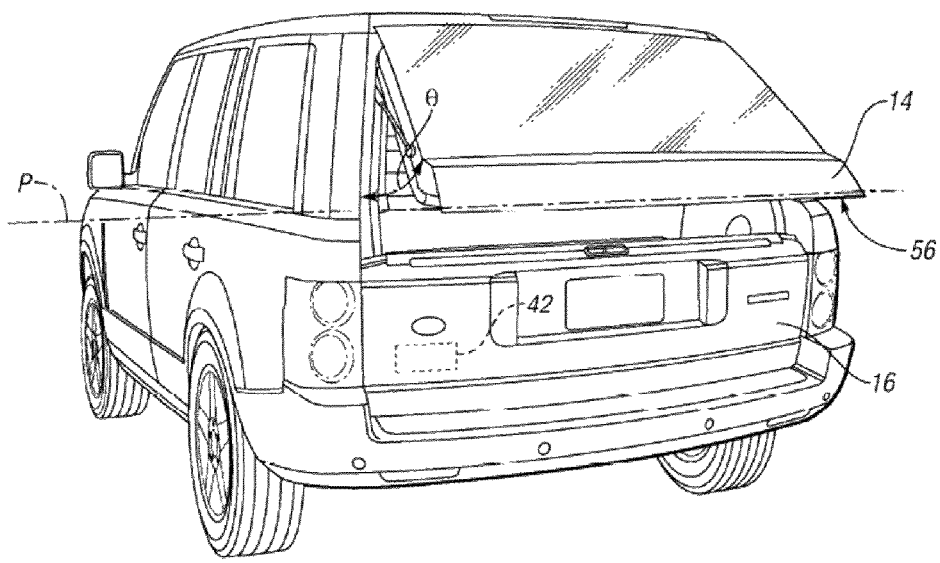
FIGS. 4a and 4b illustrate articulation of a lower tailgate door to an open position in the system of FIG. 1.
Figure 4B:
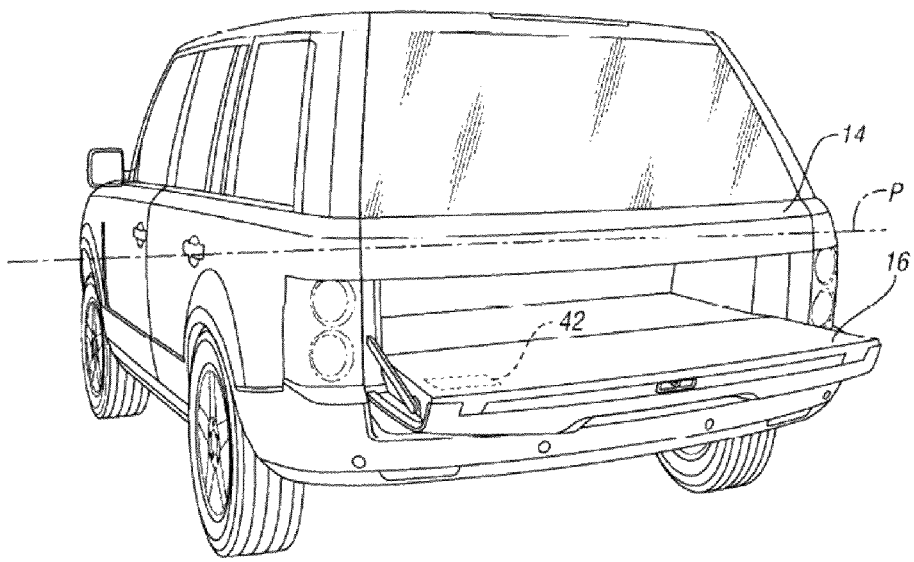

A further one of the door control sequences or modes of operation may include limiting occupant exposure to the environment (chauffeur mode) by automatically opening only the lower tailgate door 16. In the past, it was extremely difficult for a user to only open the lower tailgate door 16 since the user was required to partially open the upper tailgate door 14 first. By automatically sequencing movement of the upper and lower tailgate doors 14, 16, the controller 18 is able to automatically open the lower tailgate door 16 in an easier manner and without overly exposing the passenger compartment. When executing door control sequences according to the chauffeur mode, the upper tailgate door 14 may maintain a position below a horizontal plane P defined by the compartment cover 50 while the lower tailgate door 16 is being opened in order to limit exposure of the upper storage area and the rest of the passenger compartment to the outside elements. FIGS. 4a and 4b illustrate a sequence of door movements that maybe coordinated by the controller 18 when opening the lower tailgate door 16 according to the chauffeur mode sequence of door controls.

As noted above, the door controls contemplated by the present invention to manage articulation of the upper and lower tailgate doors 14, 16 may be instigated upon receipt of a message sent from the fob 20 or buttons 24, 26, 28, 30, 32 included on the vehicle 10. One of the vehicle buttons 28 may be included on the outside portion 76 of the upper tailgate 14 to control opening and closing of the upper tailgate door 14. Another vehicle button 30 having the same functionality of the button 28 may be included on the bottom side 56 of the upper tailgate door 14 to provide easy button access when the upper tailgate door 14 is open. Another button 32 to control open and closing of the lower tailgate door 16 may be included on the ledge 72 such that it is concealed from view when the upper door 14 is closed, which may be helpful in providing a more uniform rearward appearance for the vehicle 10 than including the button on the exterior portion 74 of the lower tailgate door 16.

With reference to FIG. 1, one of the buttons 24 may be an upper door button included on the dashboard 34 that instructs the controller 18 to open or close the upper tailgate door 14. This button 24 may be 'fixed' in that is pre-programmed to control the upper tailgate door 14 at the time of manufacturing. Another button 26 included in the dashboard 34 may be a "programmable" button in that it can be programmed by a vehicle occupant to selectively execute an available door control. For example, a programming selection menu having a number of available door control sequences may be displayed within a display or other human machine interface (HMI) 80 such that user selection of one of the door control sequences controls whether the button 26 controls both doors 14, 16 (dual mode), only the lower door 16 (chauffeur mode), or some other operation, such as but not limited to vehicle illumination, e.g., the interior/exterior of the vehicle 10, including the doors 14, 16, may be illuminated. The illumination mode may be "fixed" in vehicles having a single tailgate door or split tailgate doors where the lower tailgate door 16 is powered.

Buttons 84, 86 included on the fob 20 may mimic the functionality provided by the buttons 24, 26 included within the dashboard 34. The fob 20 may include the same "fixed" assignment of an upper door button 84 and the same "programmable" assignment of a programmable button 86. The fob 20 may also include buttons 88, 90, 92 to instruct the controller 18 to execute the vehicle controls, such as but not limited to a door unlock button 90, door lock button 88, and panic button 92, which are commonly employed with remote keyless entry (RKE) related systems. The fob 20 may also perform other operations, such as but not limited to passive entry (PE), including passively supporting tailgate door control sequences. Depression of the fob buttons 84, 86, 88, 90, 92 may instruct the fob 20 to issue a specific message depending on the depressed button. Optionally, the message transmitted from the programmable key 86 may be the same regardless of the operation to be controlled by the controller 18 in response to receipt of the message.

In an alternative embodiment the remote control 20 and the dashboard 34 may each comprise a single button for activation of the tailgate door system 12. The single button on each of the remote control 20 and the dashboard 34 may be a 'fixed' button for example for carrying out the upper only control mode sequence of operations or a 'programmable' button. It is envisaged that the function performed by the single button on remote control 20 would be the same as the function performed by the single button on the dashboard 34, though the functions could be different in yet other embodiments.

If multiple fobs 20 are authorized to control the vehicle 10, each fob 20 may be configured to issue the same message upon actuation of the same fob button 84, 86, 88, 90, 92. In this manner, the controller 18 need not interpret the messages differently depending on the fob 20 transmitting the message or throughout changes in programming of the programmable button 86. Optionally, while the messages transmitted may be the same for each fob 20, identifiers of the fob 20 transmitting the message may be included. If user specific control is desired, the controller 18 can use the identifiers to lookup an associated user in order to execute user specific operations. In this manner, a first user can program the controller 18 to execute a different tailgate door control sequence than a second user associated with another fob 20 even though both fobs 20 transmit the same message upon actuation of the programmable button 86.

Figure 5:
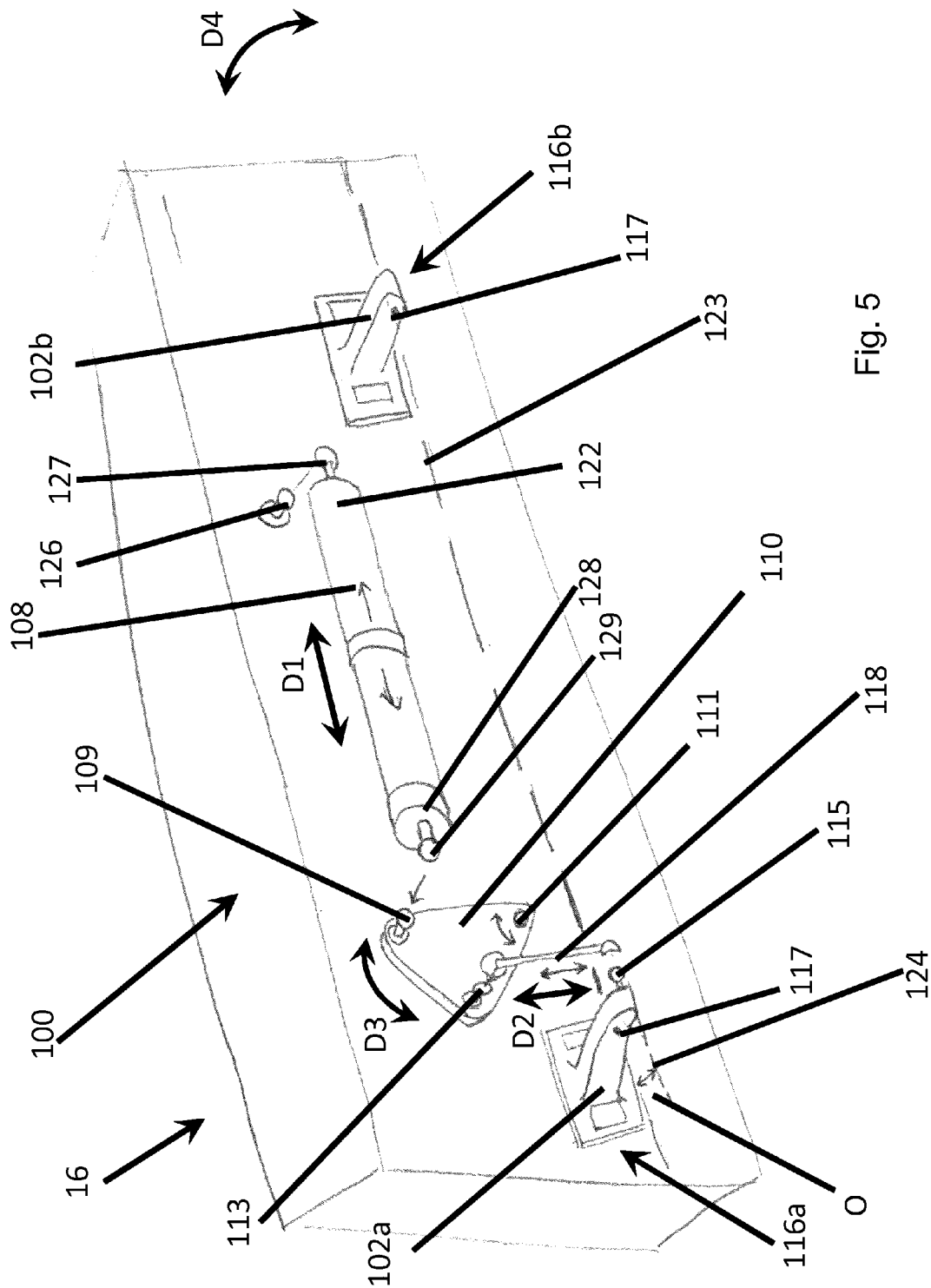
FIG. 5 illustrates schematically an external perspective view of a lower tailgate including mechanism for actuating a lower tailgate according to an embodiment of the invention.
Figure 6:
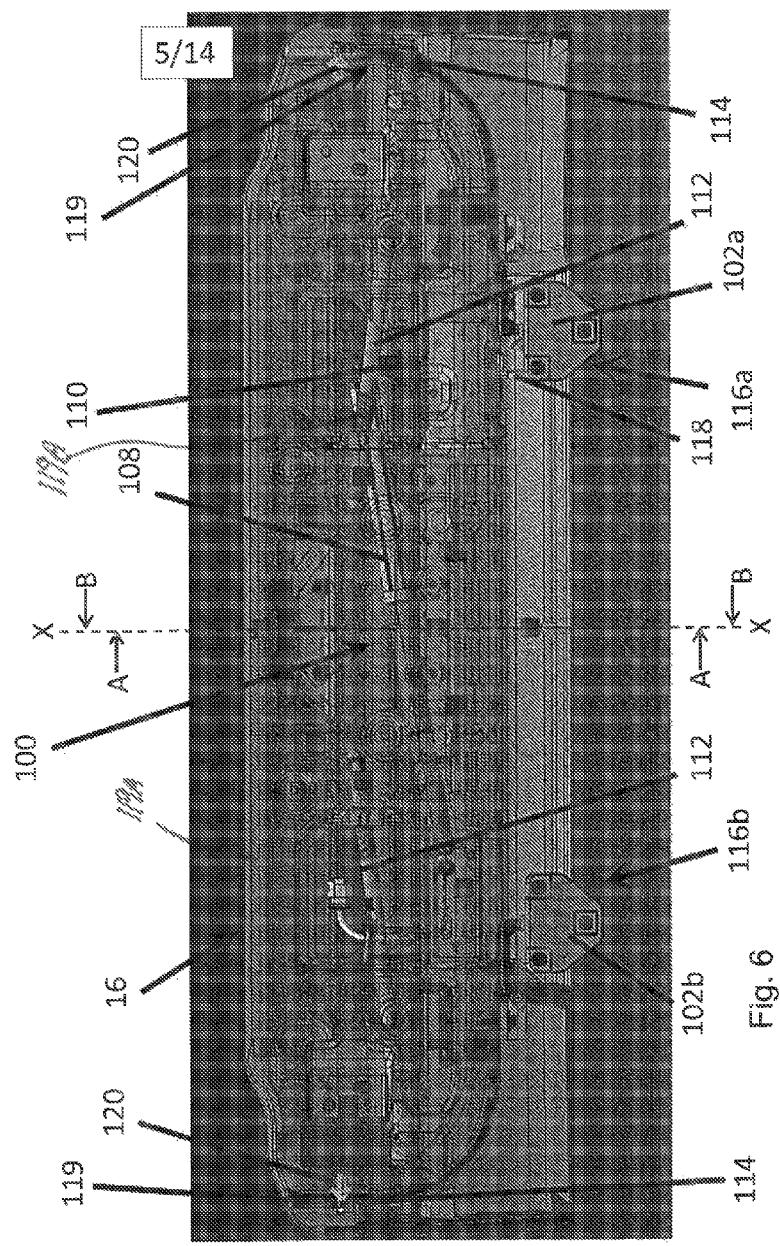
FIG. 6 illustrates schematically an internal side view of the lower tailgate and mechanism of FIG. 5.
Figure 7:
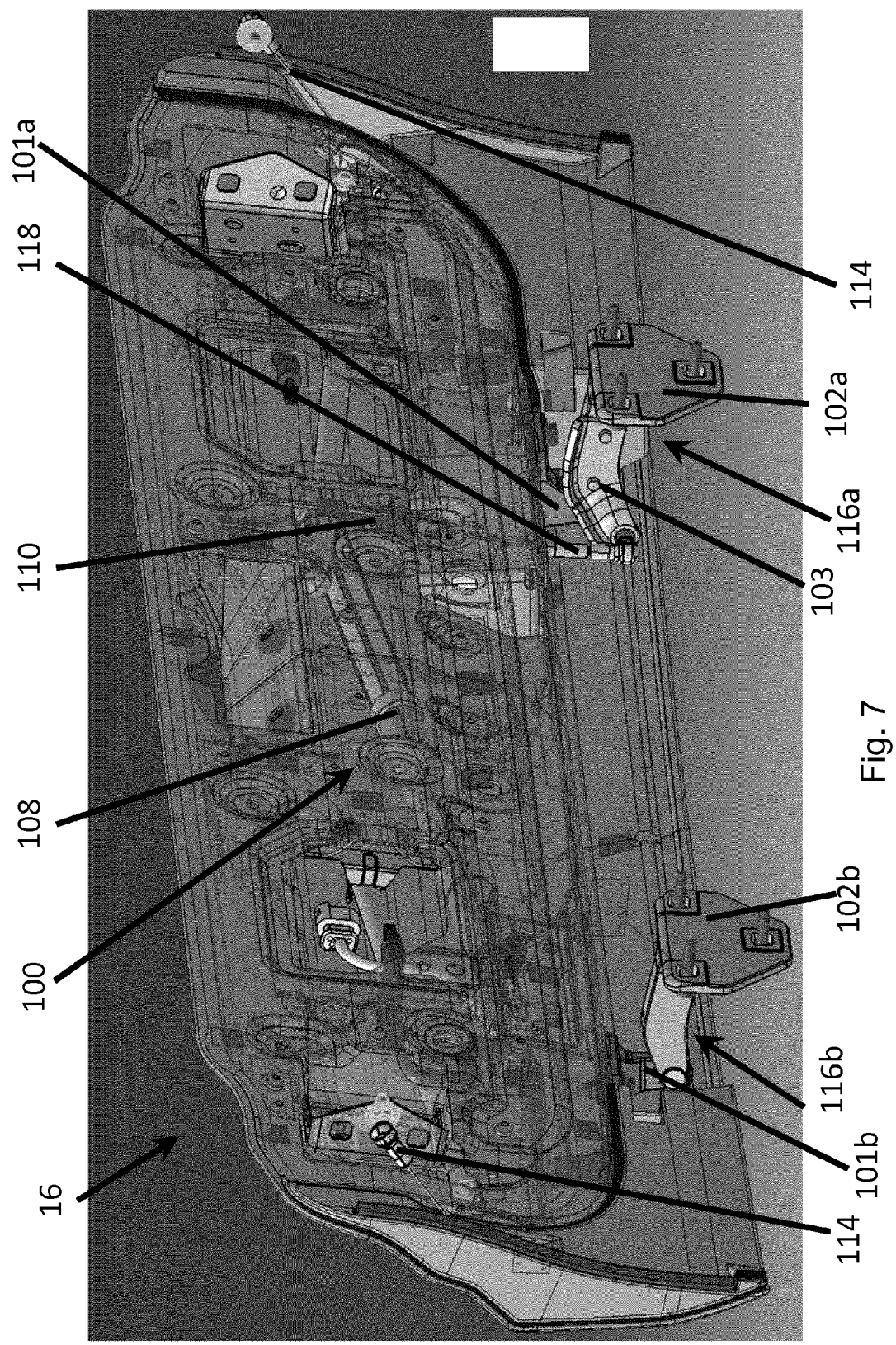
FIG. 7 illustrates schematically an internal perspective view of the lower tailgate and mechanism of FIG. 5.
Figure 8:
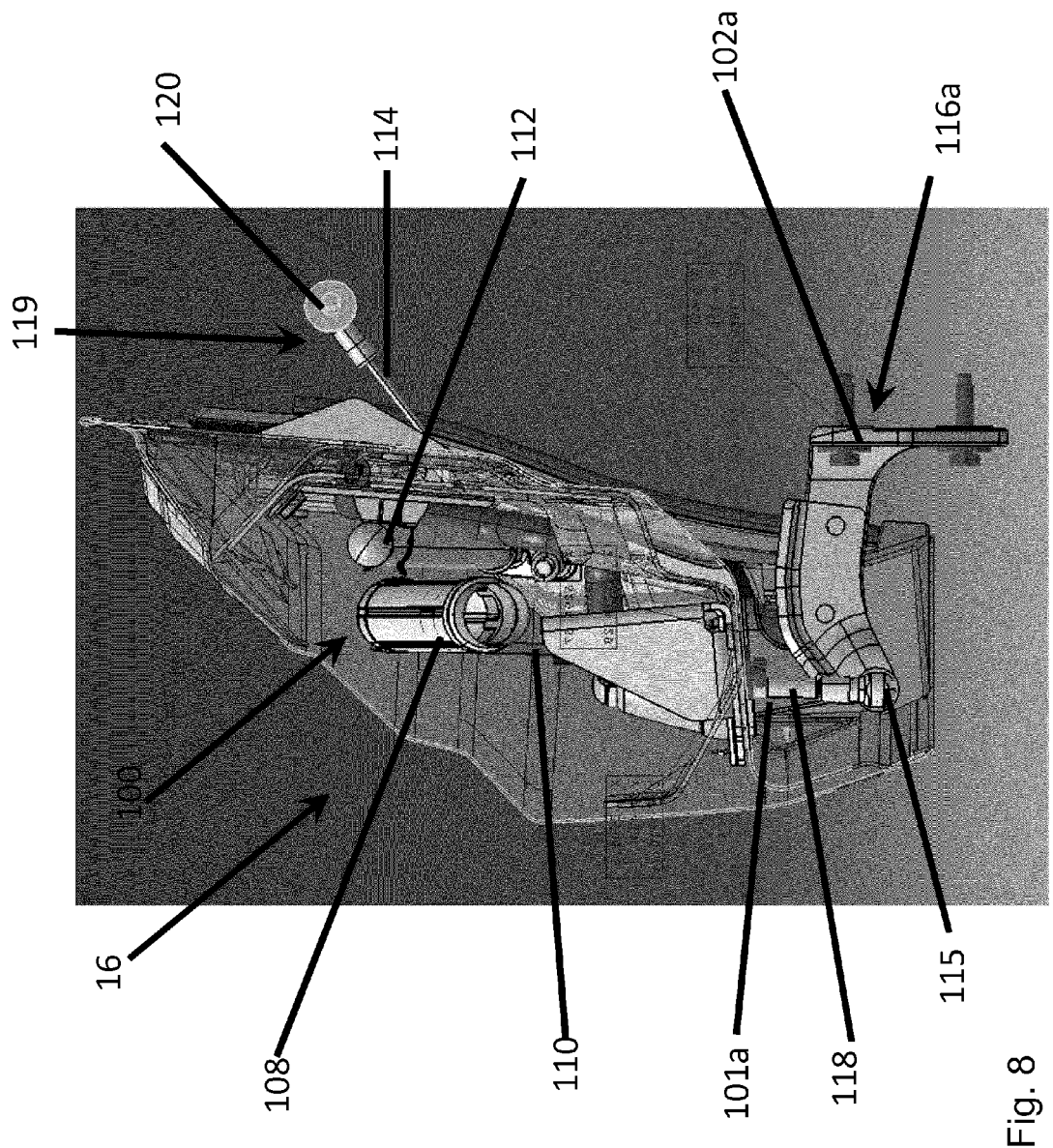
FIG. 8 illustrates schematically a first cross-sectional end view of the lower tailgate and mechanism of FIG. 5, as viewed in the direction A along the line X-X in FIG. 6.
Figure 9:
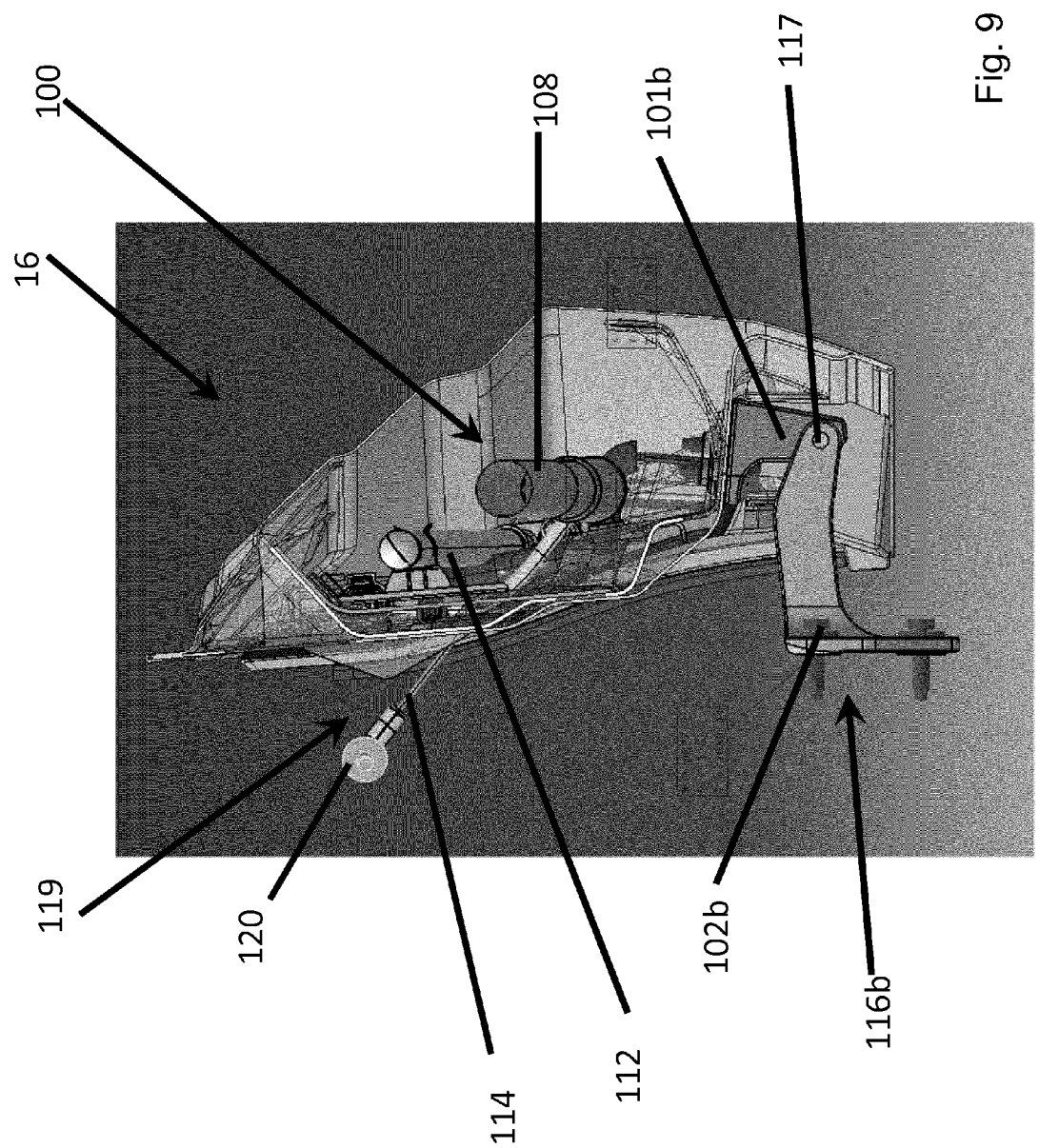
FIG. 9 illustrates schematically a second cross-sectional end view of the lower tailgate and mechanism of FIG. 5, as viewed in the direction B along the line X-X in FIG. 6.
Figure 10:
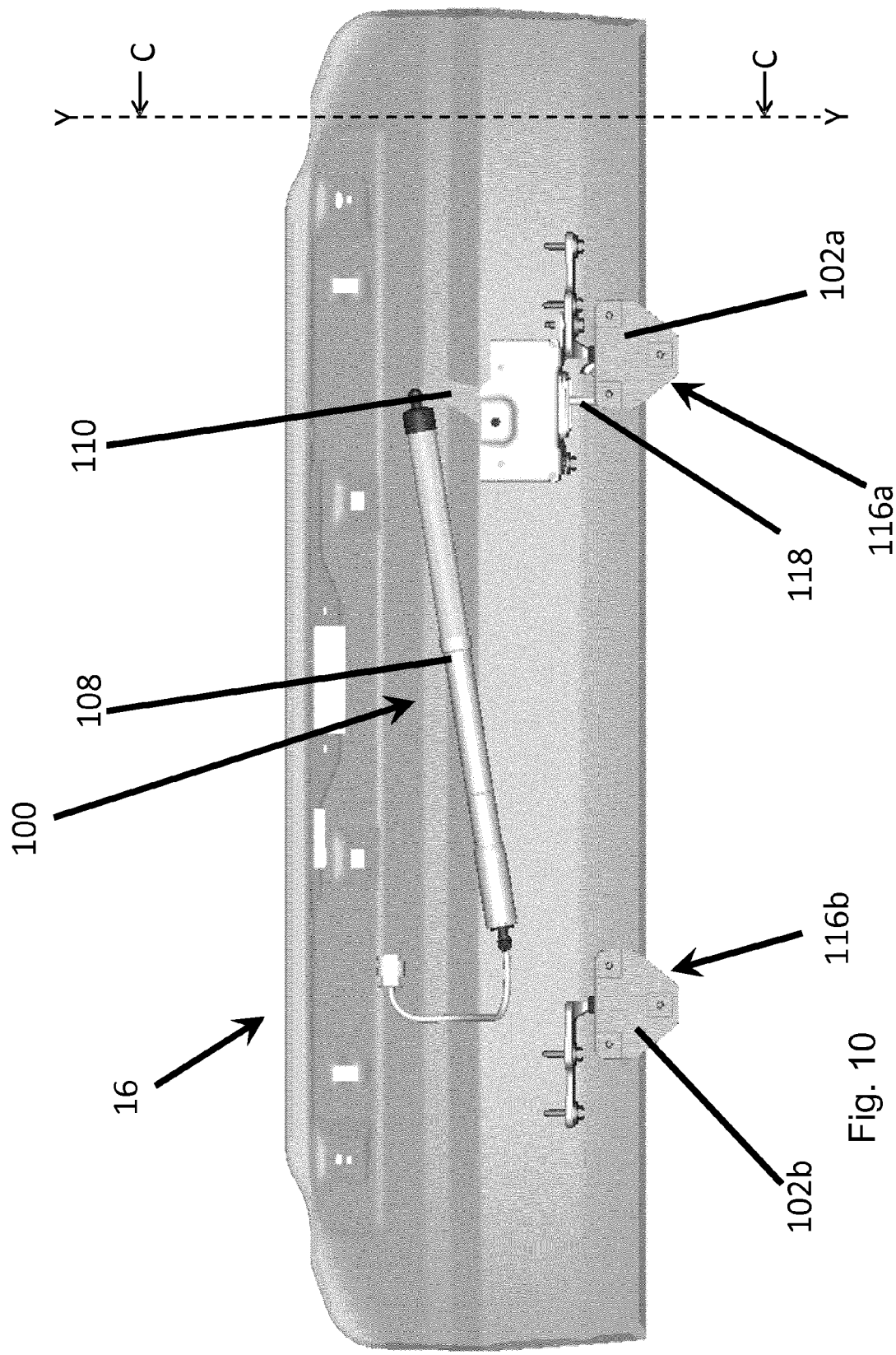
FIG. 10 is an internal perspective view of the lower tailgate shown in FIG. 6 but showing selected elements of the mechanism.
Figure 11:
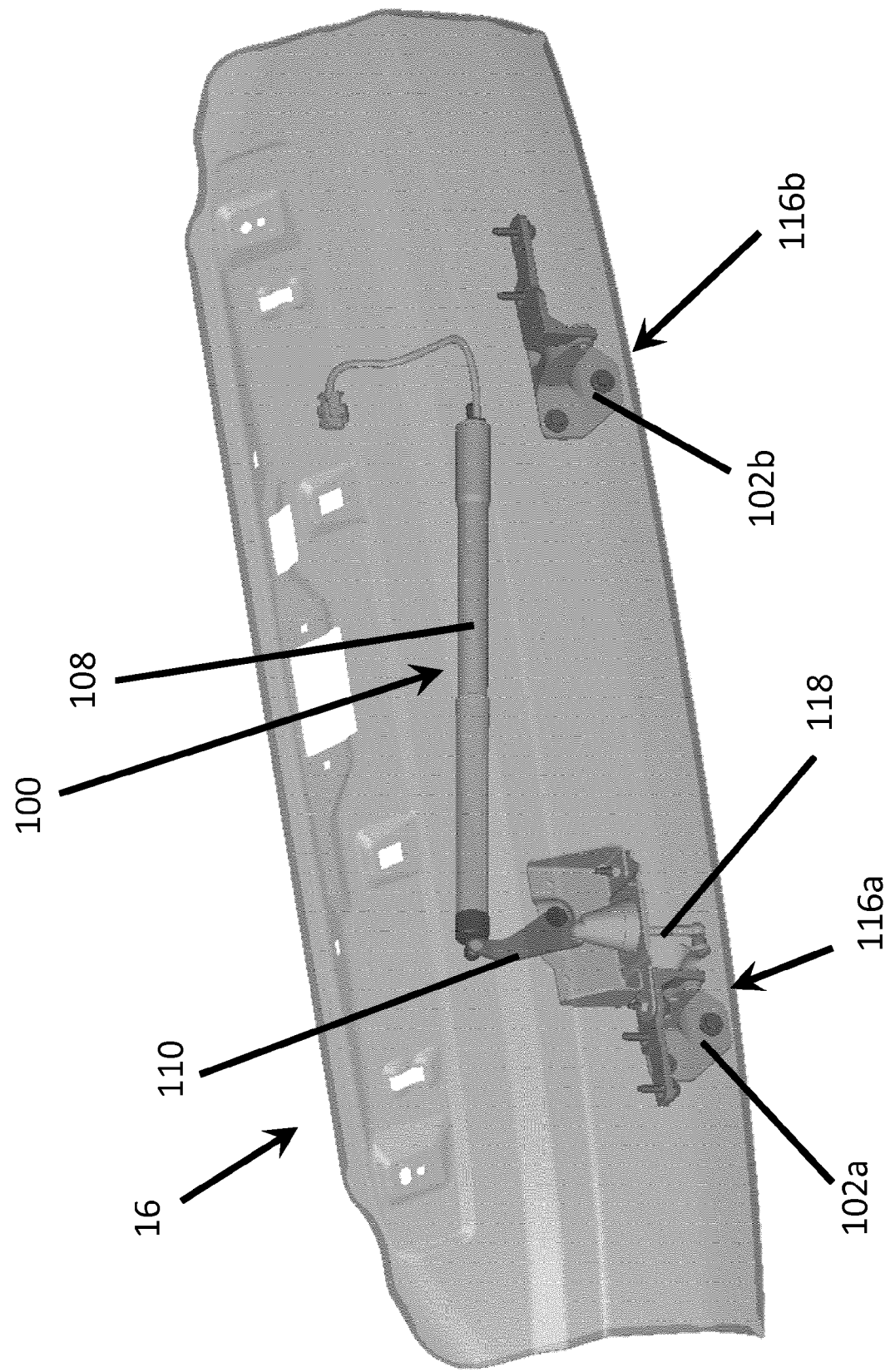
FIG. 11 is an external perspective view of the lower tailgate and mechanism shown in FIG. 10.
Figure 12:
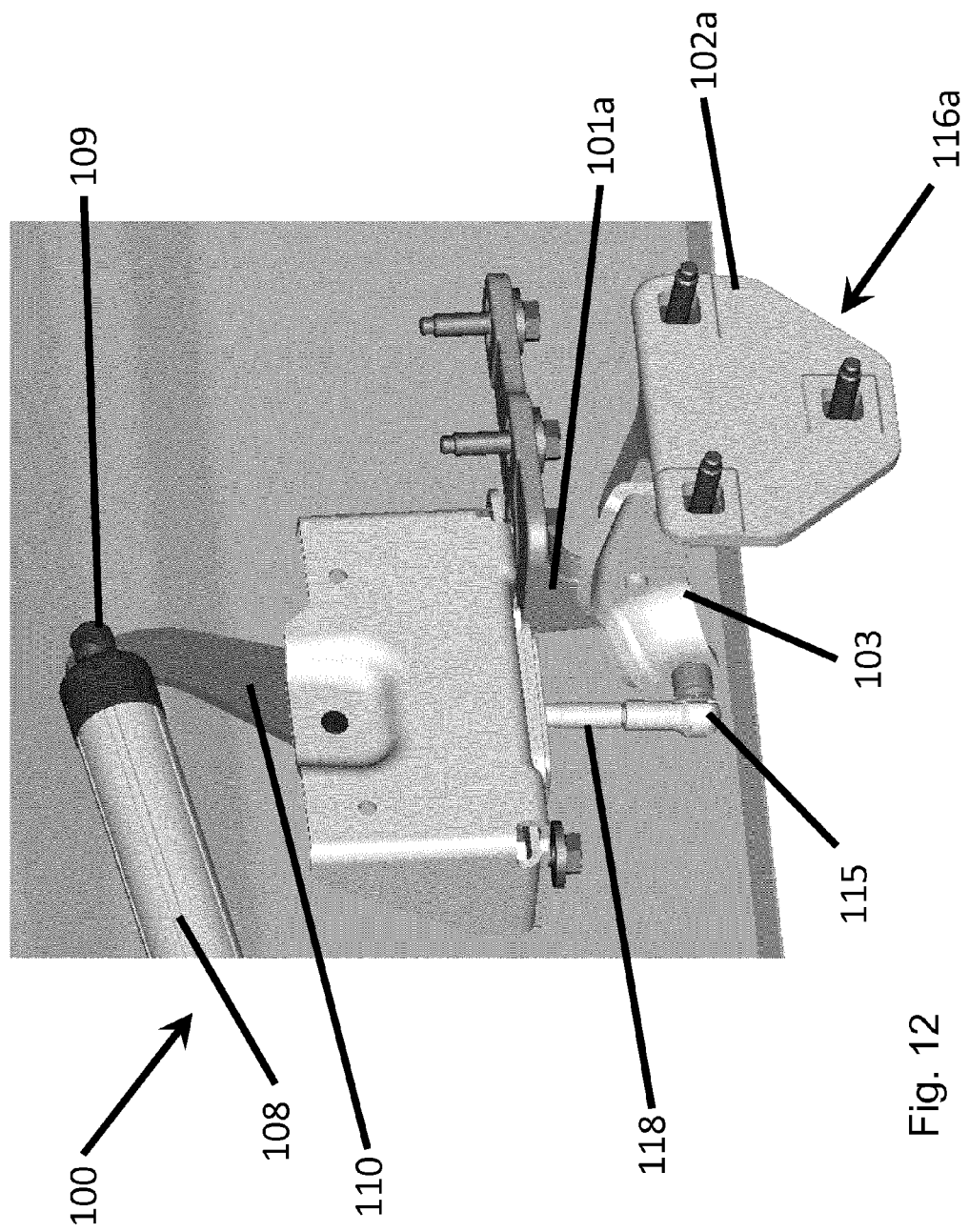
FIG. 12 is an enlarged view of part of the mechanism shown in FIG. 10.
Figure 13:
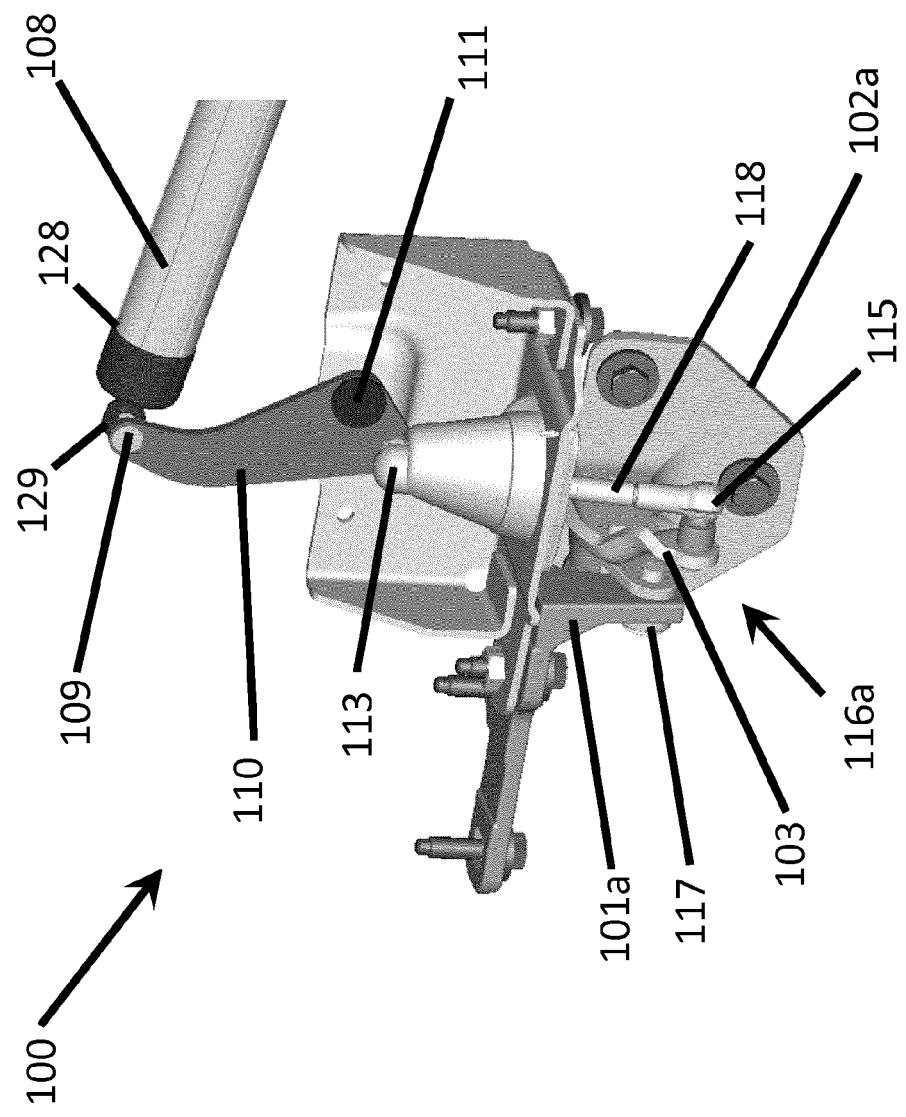
FIG. 13 is an enlarged view of part of the mechanism shown in FIG. 11.
Figure 14:
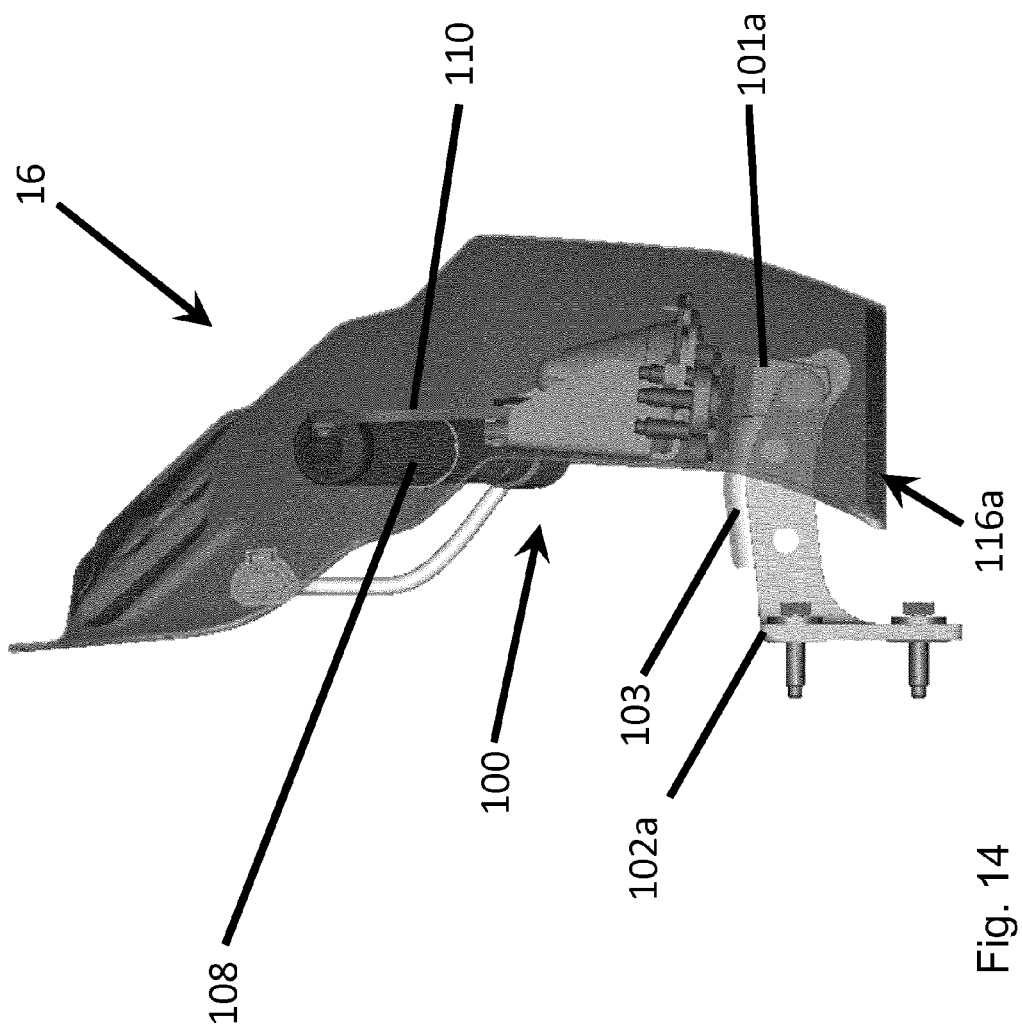
FIG. 14 is a cross-sectional end view of the lower tailgate and mechanism shown in FIG. 10, as viewed in the direction C along the line Y-Y.
Figure 15:
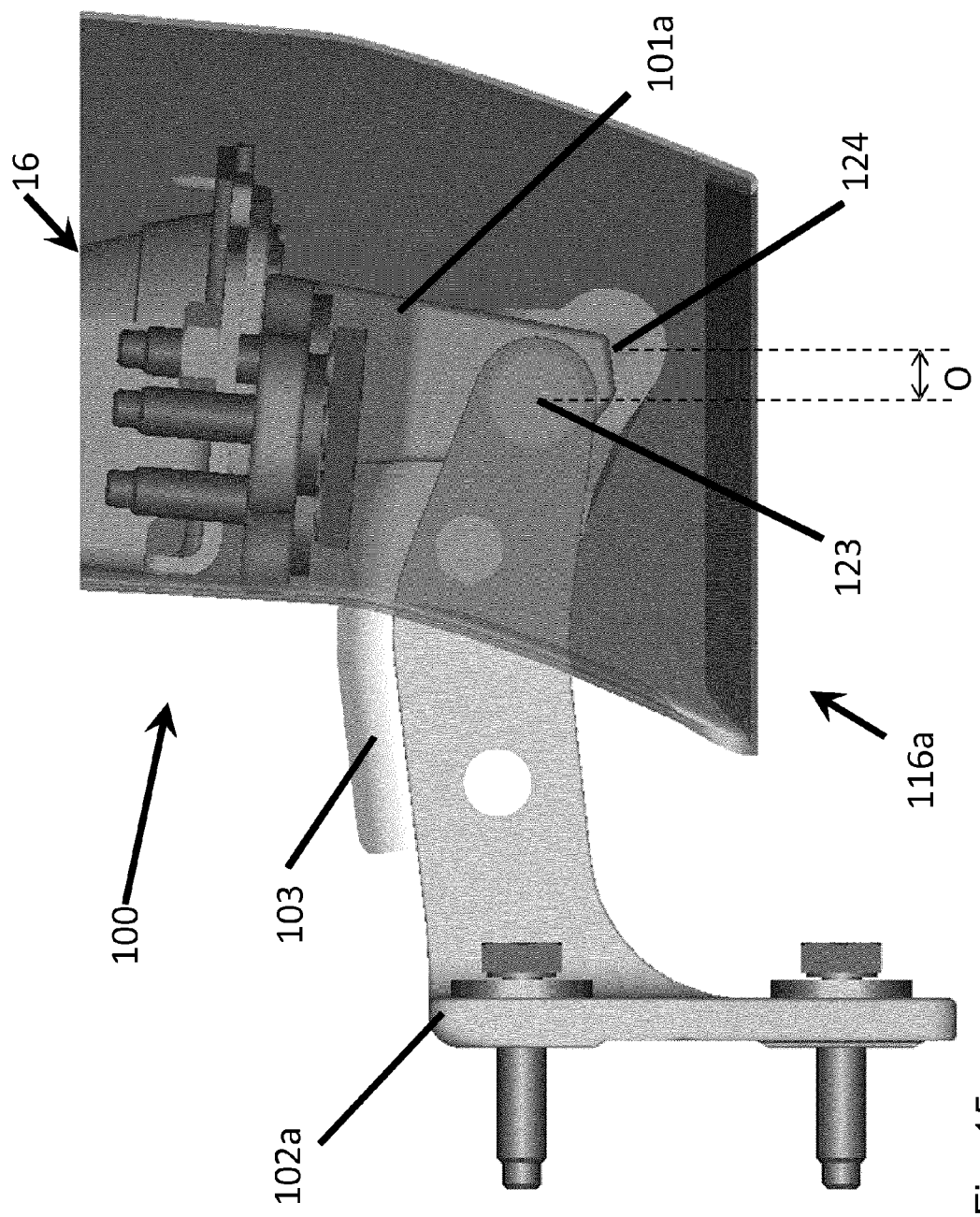
FIG. 15 is an enlarged view of a part of the mechanism shown in FIG. 14.
Figure 6:
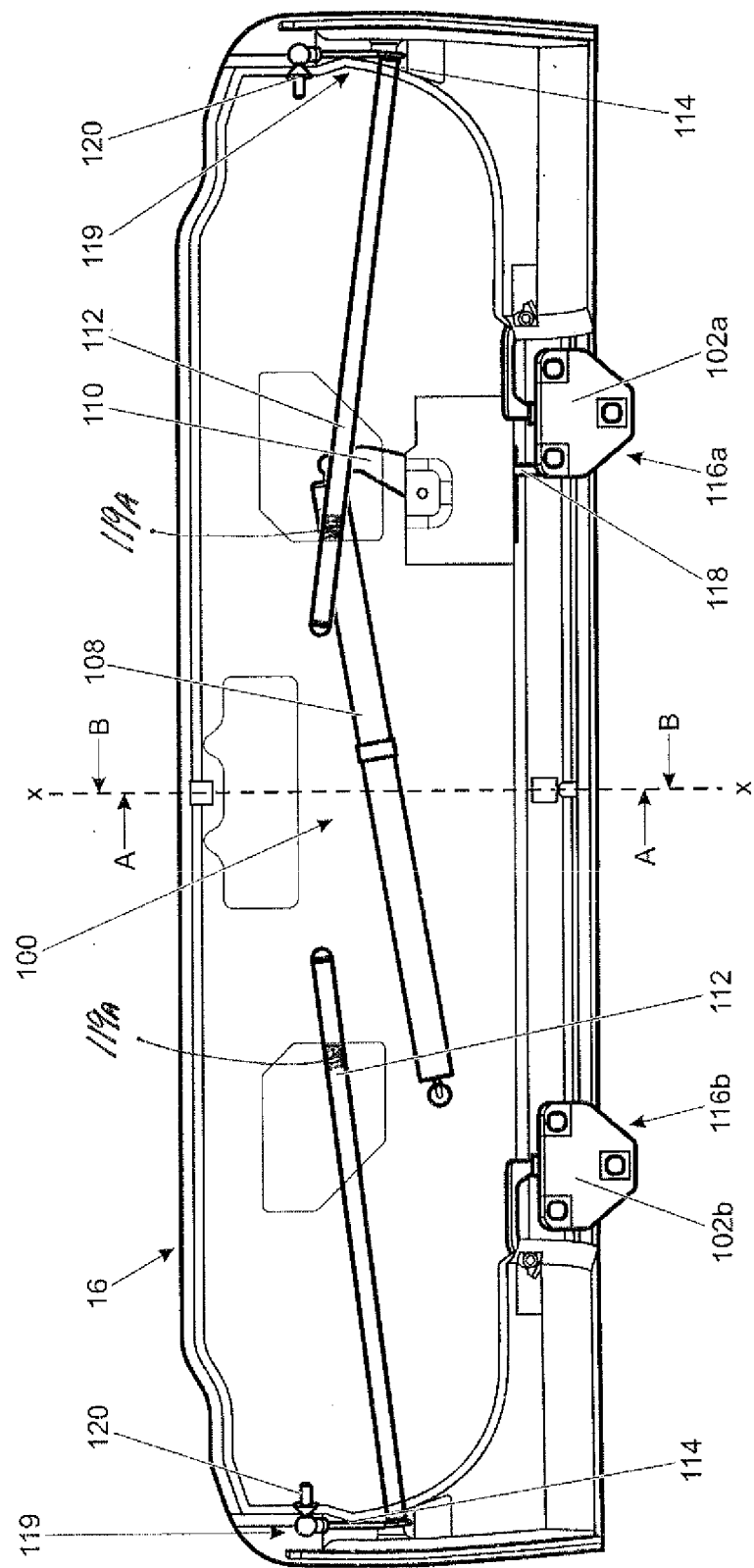

FIGS. 5 to 15 illustrate an actuator mechanism 100 provided within the lower tailgate 16 of a vehicle 10. The lower tailgate 16 is illustrated in FIGS. 5 to 15 although it will be appreciated that the mechanism 100 could be mounted within an upper tailgate 14 or other door in alternative embodiments. The lower tailgate 16 is shown in FIG. 5 from a position external of the vehicle 10. The lower tailgate 16 comprises a pair of hinges 116a, 116b; in other embodiments the lower tailgate 16 may comprise more or fewer hinges. The hinges 116a, 116b are fixedly mounted to the vehicle 10. The lower tailgate 16 is pivotally mounted to the vehicle 10 by the pair of hinges 116a, 116b and rotates about a pivot axis 123, shown as a phantom line. The hinges 116a, 116b comprise first part 101a, 101b mounted to the lower tailgate 16 and a second part 102a, 102b mounted to the vehicle 10; the first and second parts 101a, 101b, 102a, 102b being pivotally coupled 117 to one another. Optionally, the pivotal couple 117 of the hinges 116a, 116b is disposed within the interior of the lower tailgate 16.

The actuator mechanism 100 comprises an actuator 108; the actuator 108 is pivotally coupled to the lower tailgate 16 at a first end 122 and is pivotally coupled to a bell crank 110 at a second end 128. The bell crank 110 is pivotally mounted to the lower tailgate 16 by a pivot point 111.

The bell crank 110 is coupled to one of the pair of hinges 116a by a drop link 118; the drop link 118 is pivotally coupled to the bell crank 110 at one end and is pivotally coupled to the hinge 116a at an opposing end. Optionally, the drop link 118 may be coupled to a bracket 103 which is mounted the second part 102a of the hinge 116a. In alternative embodiments the drop link 118 may be directly coupled to the second part 102a of the hinge 116a upon which the ball joint may be integrated.

It is envisaged that each of the pivotal connections, between the actuator 108 and the lower tailgate 16; between the actuator 108 and the bell crank 110; between the bell crank 110 and the drop link 118; and between the drop link 118 and the hinge 116a will comprise a ball and socket joint. A ball is provided on the hinge 116a and on each of the bell crank connections 109, 113 and on the lower tailgate 16. A socket is provided at each end of the drop link 118 and at each end of the actuator 108. In other embodiment other suitable connection devices may be provided which allow rotational or pivotal movement for example, but not limited to, a hinge.

The actuator 108 comprises a first, inner, tube telescopically mounted within a second, outer, tube. Drive means, in the form of a motor (not shown), is mounted within the first tube; a spindle (not shown) is coupled to a drive shaft of the motor via a gear system, such that the motor can rotate the spindle about a longitudinal axis. The spindle comprises a helical thread disposed on an outer surface; the second tube comprises a corresponding helical thread disposed on an inner surface of the tube. In some embodiments a nut comprising an internal thread is mounted within the second tube and is mounted upon the external thread of the spindle.

The actuator 108 is electrically powered from the vehicle 10 and the length of the actuator 108 can be changed by driving the motor (not shown). Driving the motor causes the spindle to rotate which in turns causes the nut and/or second tube to travel axially along the spindle as indicated by direction arrow D1; in this way the length of the actuator 108 may be increased or decreased.

The actuator 108 comprises an electrical connection (not shown), for example an electrical power cable; optionally the electrical connection is provided at an end of the actuator 108, adjacent to, or closest to, the motor, in some embodiments this is arranged to be the first end 122 (the end furthest from the bell crank 110) of the actuator 108; this is beneficial since this limits the articulation the electrical power cable must go through when the actuator 108 is being operated.

Changing the length of the actuator 108 causes the bell crank 110 to rotate as indicated by direction arrow D3. The rotation of the bell crank 110 causes the drop link 118 to move in a direction, as indicated by direction arrow D2, which direction is disposed at an angle with respect to the direction of travel of the second tube of the actuator 108 indicated by direction arrow D1.

The pivotal connection 115 between the drop link 118 and hinge 116a is offset, by a distance O from the pivotal coupling between the hinge 116a and the lower tailgate 16 such that movement of the drop link 118 effects a rotation of the lower tailgate 16. In this way changing the length of the actuator 108 brings about a rotation of the lower tailgate 16 as indicated by direction arrow D4. The movement of the actuator 108 can be calibrated to move the lower tailgate 16 between the closed position, in which the tailgate 16 is substantially vertical, as shown in FIGS. 1, 2 and 4a, and the open position in which the tailgate 16 is substantially horizontal, as shown in FIGS. 3 and 4b. As shown in FIG. 5, the pivot point 115 between the drop link 118 and hinge 116a defines a pivot axis 124 parallel to the pivot axis 123 of the hinges 116a, 116b, and offset therefrom by the distance O.

FIGS. 6 to 9 illustrate the actuator mechanism 100 packaged within a cavity or void of the lower tailgate 16, such that the actuator 108 is concealed from view. The actuator 108 is thereby protected by the lower tailgate 16 so as to reduce the risk of damage when loading and unloading items into the vehicle 10. Furthermore the arrangement maximises the accessibility of the storage space 52 of the vehicle since the actuator mechanism 100 is contained within, that is to say it does not extend outwardly from, the lower tailgate 16.

In an alternative embodiment the lower tailgate 16 may comprise a pair of actuator mechanisms 100; one actuator mechanism 100 coupled to each of the hinges 116a, 116b; in yet other embodiments an actuator mechanism 100 may be provided for each hinge coupling the lower tailgate 16 to the vehicle 10.

The lower tailgate 16 comprises a pair of cable stays 119, the cable stays 119 are provided at each side of the lower tailgate 16. The cable stays 119 comprise a cable 114 which passes through an aperture in the lower tailgate 16. The cable stays 119 are coupled to mounting locations 120 on the vehicle 10 which are disposed on opposing sides of the opening defined by the upper and lower tailgates 14, 16. The cable stays 119 are retractable into a housing 112 which is mounted within the cavity defined by the lower tailgate 16. The cable stays 119 provide support to the lower tailgate 16 when disposed in the open position, such that if a load is placed upon the lower tailgate 16 when in the open position the cable stays 119 bear at least some of the load applied, the remainder of the load may be borne by the hinges 116a, 116b. In this way the cable stays 119 prevent over rotation or opening of the lower tailgate 16. The cable stays 119 comprise a retraction device such as a coil spring 119a (FIG. 6) mounted within the housing 112, these coil springs 119a provide a counterbalancing force which is substantially sufficient that the tailgate 16 may be held in equilibrium through the range of motion of the lower tailgate 16; that is to say the lower tailgate 16 may remain stationary if the motor is stopped from driving the actuator at positions between the fully closed position and the fully opened position; some angles of the lower tailgate 16, or inclinations of the vehicle 10 the lower tailgate 16 may have a self-opening or self-closing tendency. In alternative embodiments the retraction mechanism may be sufficient to hold the lower tailgate 16 stationary at any position of its travel.

In this embodiment there is no requirement to provide a counterbalancing spring within the actuator 108. This is possible because the torque around the hinges 116a, 116b is lower than that of the upper tailgate 14, since the lower tailgate has a lower mass than the upper tailgate 14, it is smaller in dimension than the upper tailgate 14 additionally it does not comprise a heavy glass panel, the centre of mass of the lower tailgate is disposed at a smaller distance from the hinges 116a, 116b about which the tailgate pivots.

FIGS. 10 to 15 illustrate the actuating mechanism 100 of the lower tailgate door 16 in isolation with other components of the door omitted for clarity. As shown best in FIG. 15, the offset O between the pivot axis 123 of the first hinge 116a and the pivot axis 124 defined by the coupling between the drop link 118 (not visible in FIG. 15) and the bracket 103 ensures that the force applied by the actuating mechanism 100 to the vehicle 10 acts about a point which is spaced apart from the pivot axis 124 of the hinges 116a, 116b. This offset provides the necessary mechanical leverage for the actuating mechanism to be able to open and close the lower tailgate door 16. It will be understood that although, in the present embodiment, the drop link 118 transmits the force of the actuator 108 to the vehicle 10 via the bracket 103 which, in turn, is fixed to the second part 112a of the first hinge 116a, the drop link 118 could be pivotally attached to another suitable support structure provided on the vehicle. For example, a dedicated bracket, separate from either of the hinges 116a, 116b could be provided at a point between the respective hinges 116a, 116b.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

It will be recognised that as used herein, directional references such as "top", "bottom", "front", "back", "end", "side", "inner", "outer", "upper" and "lower" do not limit the respective features to such orientation, but merely serve to distinguish these features from one another.

It can be appreciated that various changes may be made within the scope of the present invention, for example, it is envisaged that the bell crank 15 and drop link 118 may be omitted and the actuator 108 may be mounted directly an end of the hinge 116a which is disposed within the cavity defined by the lower tailgate 16, in such embodiments it will be appreciated that the orientation of the actuator 108, and/or the location of its connection to the tailgate may be adjusted so as to achieve the rotational movement of the lower tailgate 16, for example the actuator may be orientated and positioned in a location similar to that of the drop link 118. In other embodiments the cable stay may comprise an alternative suspension structure for example the cable may be replaced with, but not limited to, a chain, rope or cord, webbing, belt or strap. It is envisaged that in other embodiments the actuator 108 may comprise a piston and cylinder which are hydraulically or pneumatically operated, the drive means may comprise a pump for driving the piston.

While embodiments of the invention have been illustrated and described, it is not intended that these embodiments illustrate and describe all possible forms of the invention. Rather, the words used in the specification are words of description rather than limitation, and it is understood that various changes may be made without departing from the scope of the invention.

The invention claimed is:
1. A split power door system for a vehicle comprising:
an upper door arranged to articulate between a closed position and an open position;
a lower door hingedly mountable to a vehicle for articulation about a pivot axis between a closed position and an open position, the lower door comprising a cavity;
an actuator mechanism disposed within the cavity, the actuator mechanism being pivotally coupleable to the vehicle at a position offset from the pivot axis; and
drive means for driving the actuator mechanism to articulate the lower door between said closed and said open positions;
wherein the actuator mechanism comprises an actuator and a bell crank, and wherein the actuator provides linear motion and is coupled at a first end thereof to a hinge via the bell crank, the bell crank being pivotally mounted to the lower door within the cavity, the actuator being pivotally coupled at a second end thereof to the lower door.

2. A system according to claim 1 wherein the pivot axis about which the lower door articulates is disposed within the cavity.

3. A system according to claim 1 wherein the drive means is disposed within the cavity.

4. A system according to claim 1, comprising a hinge having a first part fixed to the lower door and a second part fixable to the vehicle, a pivot axis of the hinge defining the pivot axis about which the lower door articulates.

5. A system according to claim 4, wherein the actuator mechanism is pivotally coupled to a support structure of the vehicle, wherein said support structure of the vehicle comprises the second part of the hinge.

6. A system according to claim 1, wherein the bell crank is coupled to the hinge by a link arm disposed within the cavity.

7. A system according to claim 1, wherein the actuator is mounted in a first orientation and the bell crank changes an orientation of the linear motion.

8. A system according to claim 1, wherein the drive means comprises at least one electric motor.

9. A system according to claim 8, wherein the motor is positioned within a watertight interior of the lower door.

10. A system according to claim 1, comprising a controller for controlling the drive means so as to cause the actuator mechanism to articulate the lower door between the open and closed positions.

11. A system according to claim 10, comprising a further mechanism for moving the upper door, wherein the controller is arranged to independently control the drive means and the further mechanism, and the upper and lower vehicle doors being arranged such that the upper door must be at least partially opened to allow opening or closing of the lower door.

12. A system according to claim 1, comprising a further mechanism for moving the upper door.

13. A system according to claim 12, wherein the system is a power split tailgate system for a vehicle having a rear storage area.

14. A system according to claim 13, wherein the lower door is a lower tailgate door and the upper door is an upper tailgate door.

15. A system according to claim 1 wherein the lower door comprises a retractable suspension means for bearing a load applied to the lower door, wherein the retractable suspension means comprises a retraction device which counterbalances the weight or turning moment of the lower door about the pivot axis.

16. A system as claimed in claim 15, wherein the retraction device is disposed within a cavity in the interior of the lower door.

17. A vehicle having a door system as claimed in claim 1.

* * * * *

UNITED STATES PATENT AND TRADEMARK OFFICE
CERTIFICATE OF CORRECTION

Page 1 of 2

PATENT NO. : 9,636,978 B2
APPLICATION NO. : 14/426219
DATED : May 2, 2017
INVENTOR(S) : Andrew Warburton, Duncan Loveday and Steven Thomas It is certified that error appears in the above-identified patent and that said Letters Patent is hereby corrected as shown below:

In the Drawings

Replace drawing sheet 5 of 14 with attached drawing sheet 5 of 14

Signed and Sealed this
Seventh Day of November, 2017

Joseph Matal
*Performing the Functions and Duties of the*
*Under Secretary of Commerce for Intellectual Property and*
*Director of the United States Patent and Trademark Office*